United States Patent
Song

(10) Patent No.: US 9,210,964 B2
(45) Date of Patent: Dec. 15, 2015

(54) BATTERY CASING FOR ILLUMINATING FOOTWEAR

(75) Inventor: Xue Feng Song, Shen Zhen (CN)

(73) Assignee: Xue Feng Song, Shenzhen (CN)

( * ) Notice: Subject to any disclaimer, the term of this patent is extended or adjusted under 35 U.S.C. 154(b) by 524 days.

(21) Appl. No.: 13/400,805

(22) Filed: Feb. 21, 2012

(65) Prior Publication Data

US 2013/0212911 A1    Aug. 22, 2013

(51) Int. Cl.
*A43B 23/00* (2006.01)
*A43B 3/00* (2006.01)
*H01M 2/10* (2006.01)
*A43B 13/12* (2006.01)

(52) U.S. Cl.
CPC ............... *A43B 3/001* (2013.01); *A43B 3/0015* (2013.01); *A43B 13/122* (2013.01); *H01M 2/1044* (2013.01); *H01M 2/1094* (2013.01); *H01M 2220/30* (2013.01); *Y10T 29/49108* (2015.01)

(58) Field of Classification Search
CPC .... A43B 13/122; A43B 3/001; A43B 3/0015; A43B 3/0005
USPC .......... 36/137, 132, 136; 340/323 R; 310/311, 310/319, 328
See application file for complete search history.

(56) References Cited

U.S. PATENT DOCUMENTS

| | | | | |
|---|---|---|---|---|
| 5,500,635 A | * | 3/1996 | Mott ......................... | 340/323 R |
| 5,599,088 A | * | 2/1997 | Chien ......................... | 362/103 |
| 5,644,858 A | * | 7/1997 | Bemis ......................... | 36/137 |
| 5,732,486 A | * | 3/1998 | Rapisarda ......................... | 36/137 |
| 6,017,128 A | * | 1/2000 | Goldston et al. ............... | 362/103 |
| 6,238,056 B1 | * | 5/2001 | Rapisarda ..................... | 362/103 |
| 6,789,913 B2 | * | 9/2004 | Wei .............................. | 362/103 |
| 7,596,891 B2 | * | 10/2009 | Carnes et al. ................... | 36/132 |
| 7,611,259 B2 | * | 11/2009 | Tseng .............................. | 362/184 |
| 7,614,166 B2 | * | 11/2009 | Vick et al. ........................ | 36/137 |

* cited by examiner

*Primary Examiner* — Jila M Mohandesi

(74) *Attorney, Agent, or Firm* — James Cai; SAC Attorneys LLP

(57) ABSTRACT

A method is for manufacturing a battery box for footwear comprising: providing a first member and providing a second member. The method also includes connecting the first member and the second member such that the first member and the second member include a space. The method also includes placing the first and the second member in the footwear such that the first and the second member form a structure in the footwear.

23 Claims, 8 Drawing Sheets

BATTERY CASING FOR ILLUMINATING FOOTWEAR

FIELD OF THE INVENTION

The present disclosure is directed to an improved battery box of module, which is installed in outsole of footwear. More particularly, the present disclosure is directed to a battery box that is robust and waterproof and is made without any resin fill into the battery box and can be installed in footwear. More particularly, the present disclosure is directed to a two-part battery box that is sealed to be waterproof, and which may be connected into a heel of a shoe.

BACKGROUND OF THE RELATED ART

Footwear that includes an illumination device (module) is very advantageous for children. Generally, the footwear includes an illumination device that includes LED light(s) and a battery(s) and wires and a circuit and a switch. Generally, since the footwear must be utilized for all terrain and weather conditions, the module is sealed. However to make a module is very time consuming and expensive in that a great amount of resin is utilized to fill up the battery box and to ensure it is waterproof and protected.

Currently, this is time consuming and difficult and expensive to fill up the battery box with resin. It would be desirable to simplify the process to manufacture footwear.

SUMMARY OF THE INVENTION

According to a first aspect of the present disclosure, there is provided a method. The method is for manufacturing a battery box for footwear comprising: providing a first member and providing a second member. The method also includes connecting the first member and the second member such that the first member and the second member have a space therein. The method also includes placing the first and the second member in the footwear such that the first and the second member form a designed certain function structure in the footwear.

In another embodiment, the method may also include arranging the first member as a cover. In an embodiment, the method may further comprise arranging the second member as a base In another aspect, there is provided a method that includes connecting the first member to the second member by any method known in the art, for example, by connecting the first member to the second member by an adhesive.

In yet another further aspect, the method also includes connecting the first member to the second member by any kind of hot press operation.

In a further aspect, the method may also include forming an exit in the battery box, and connecting the first and the second member to be waterproof.

In another embodiment, the method may also include operatively connecting a circuit comprising LED light(s), battery(s), wires, circuit board, and switch for illuminating the footwear.

Additionally, in another embodiment, the method includes placing the circuit in at least one of the first member and the second member, attaching a first end of a plurality of wires to the circuit, connecting the first member and the second member to form the battery box, forming the exit in the battery box, bringing out the second end of the plurality of wires from the battery box, and then sealing the battery box and the exit to make the battery box water proof. In this embodiment, the space within the battery box is water proof and also free from resin.

In another embodiment, the present disclosure may be directed to a battery box for footwear comprising: a first member; a second member being connected to the first member such that the first member and the second member include a space therein; and a footwear, wherein the first and the second member are located in the footwear.

In another embodiment, the footwear may include a battery box in the enclosure, and an illumination device connected to the battery. The first member may be a cover. The first member is connected to the second member and or connected by an adhesive, or connecting by any kind of hot press operation.

The battery box may also include the first member connected to the second member to form the battery box that can be sealed seamlessly. An exit may be formed in the battery box. The first and the second member can be connected to one another to be waterproof. The battery box may also include a circuit comprising a wire, circuit board, and switch to a battery for illuminating the footwear.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, the drawings are illustrative of certain ways of performing the invention. Others will be readily apparent to those skilled in the art.

DETAILED DESCRIPTION OF THE PREFERRED EMBODIMENTS

Figure 1:
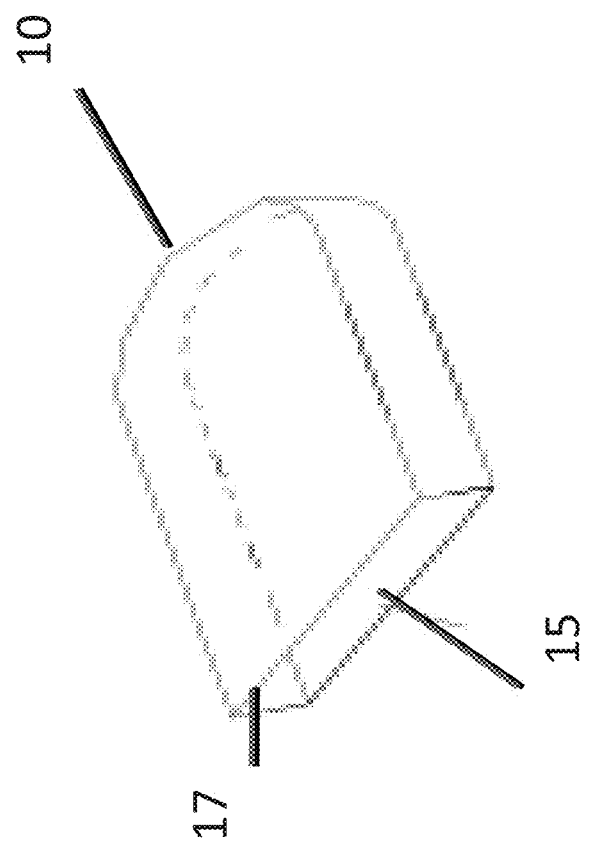
FIG. 1 shows a schematic of a device for a battery box.

FIG. 1 shows a prior art battery box 10 for a footwear that is a single composite box with an exit 15 on the front end 17 of the battery box 10. In the prior art battery box 10 of FIG. 1, resin is poured into the battery box 10 before sealing in order to make it waterproof. However, the use of resin will cause many problems including a weight of the battery box 10 that is about twice as much as the new battery box of the present invention.

Figure 2:
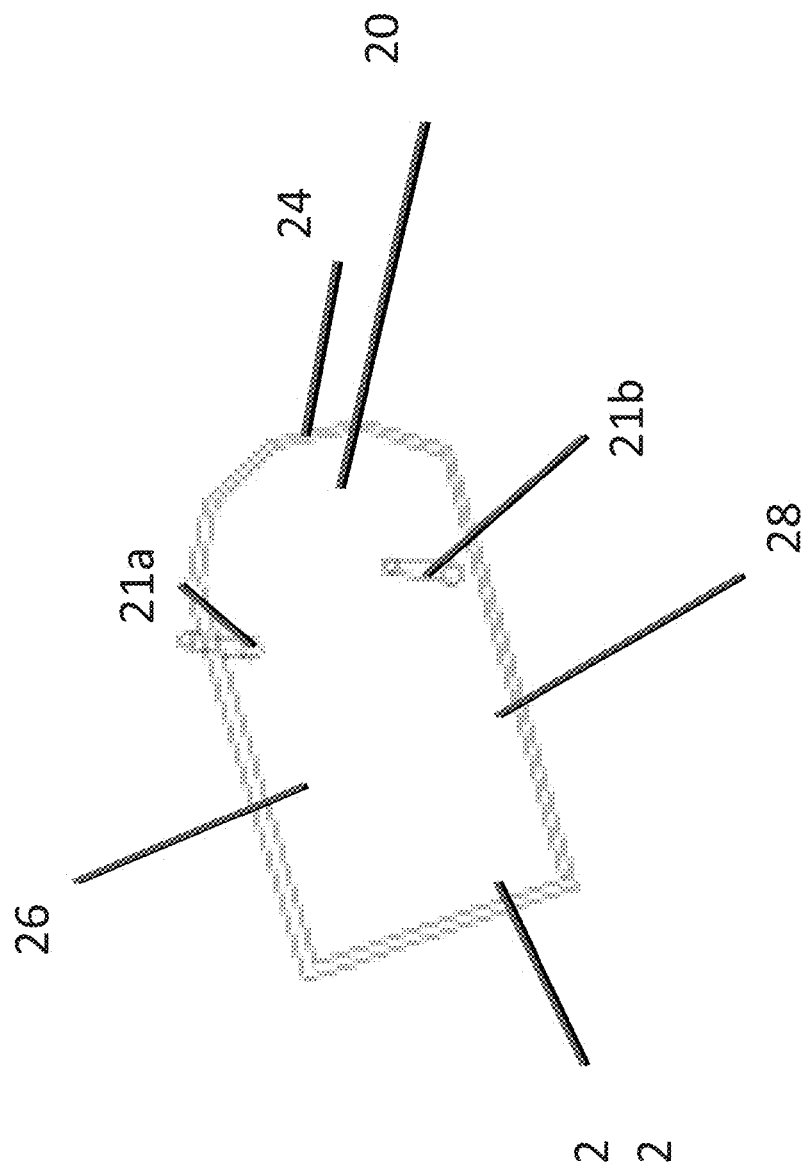
FIG. 2 show an exterior view of a cover for a new battery box of the present invention.

FIG. 2 illustrates a first member of a new battery box that is made from, in one embodiment, plastic that is lightweight. The first member is a cover 20. The cover 20 includes a generally straight front side 22, a curved rear side 24 and generally straight sides 26 and 28. The cover 20 will not be damaged when stepped on by a human being. The cover 20 also includes first and second pegs 21a and 21b for connecting with a second member. Generally, cover is 20 made very lightweight. In one embodiment, the cover 20 may be made from hard plastic, for example, Acrylonitrile Butadiene Styrene (ABS) etc.

Figure 3:
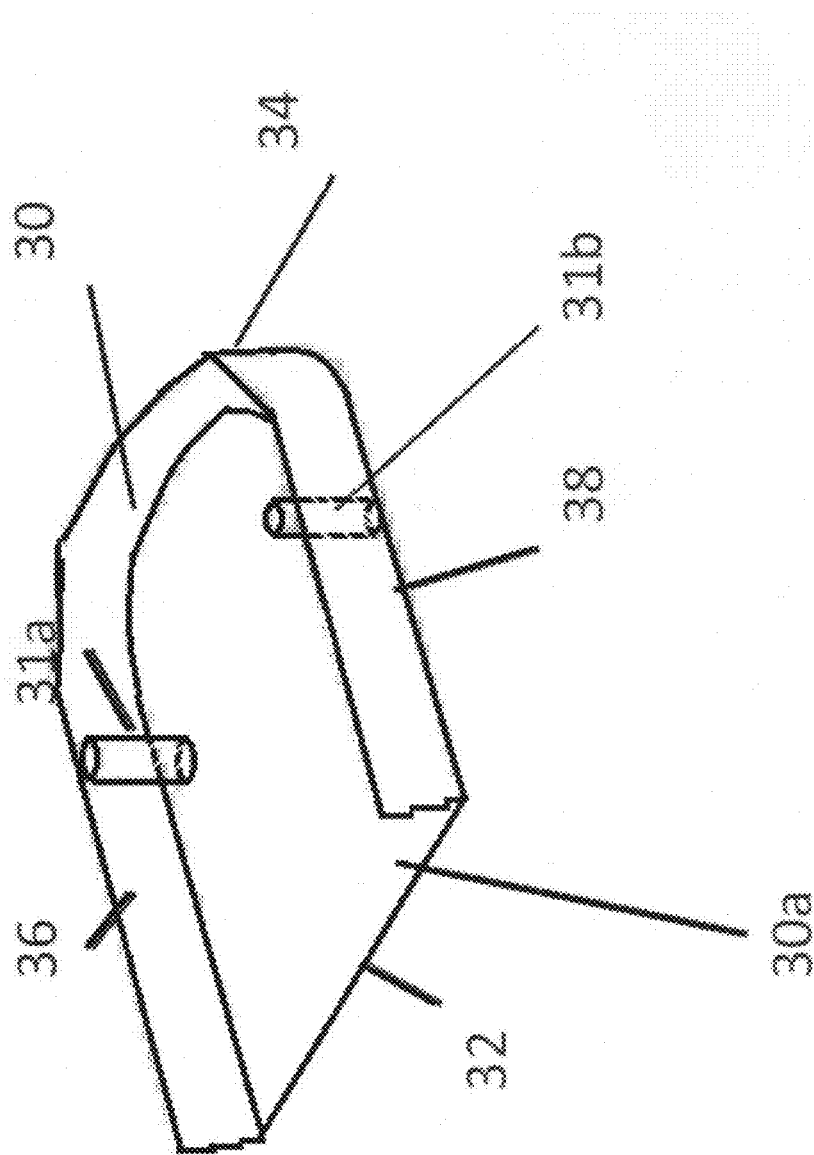
FIG. 3 shows an exterior view of a base for a new battery box according to the present disclosure.

FIG. 3 illustrates a second component of the battery box or the base 30. The base 30 includes a planar member 30 that includes a front 32 and a rear 34 and sides 36 and 38. The base 30 also includes receiving structures 31a and 31b to mate with the cover 20. Additionally, an exit 30a is formed therein. Base 30 may be made from hard plastic, for example, Acrylonitrile Butadiene Styrene (ABS) etc.

Figure 4:
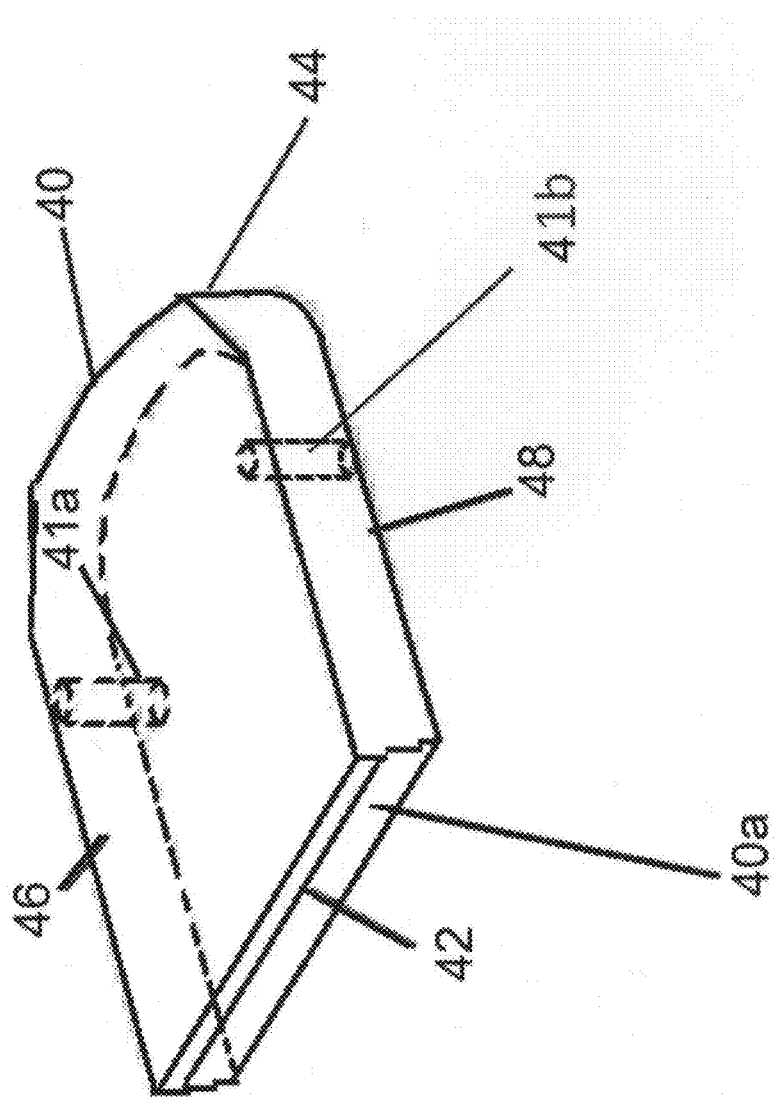
FIG. 4 shows an embodiment of the cover and base seamlessly welded to form the battery box according to the present disclosure.

FIG. 4 illustrates the formed battery box 40 with the cover 20 mated with the base 30. The battery box 40 dramatically improves the current product process and solves the above problems accordingly. The battery box 40 adopts a two part 20, 30 structure and design, which include cover 20 and base 30. By plugging the cover 20 into the base 30 and sealing the cover and the base using a secondary processes such as a connector, ultrasonic welding, hot-pressing or gluing, the battery box 40 will seal seamlessly and be water proof. After using a predetermined sealing material to seal the front end 42 and the exit 44, the battery box 40 will have waterproof functionality. This invention will greatly improve the efficiency of the current production, eliminate the use of resin and is more environment-friendly. The battery box 40 when assembled includes a front 42 and a rear 44 and the front and the rear 42. The battery box 40 also includes sides 46 and 48. A sealed exit 40a is also provided to let wires come out shown in FIG. 5.

Figure 5:
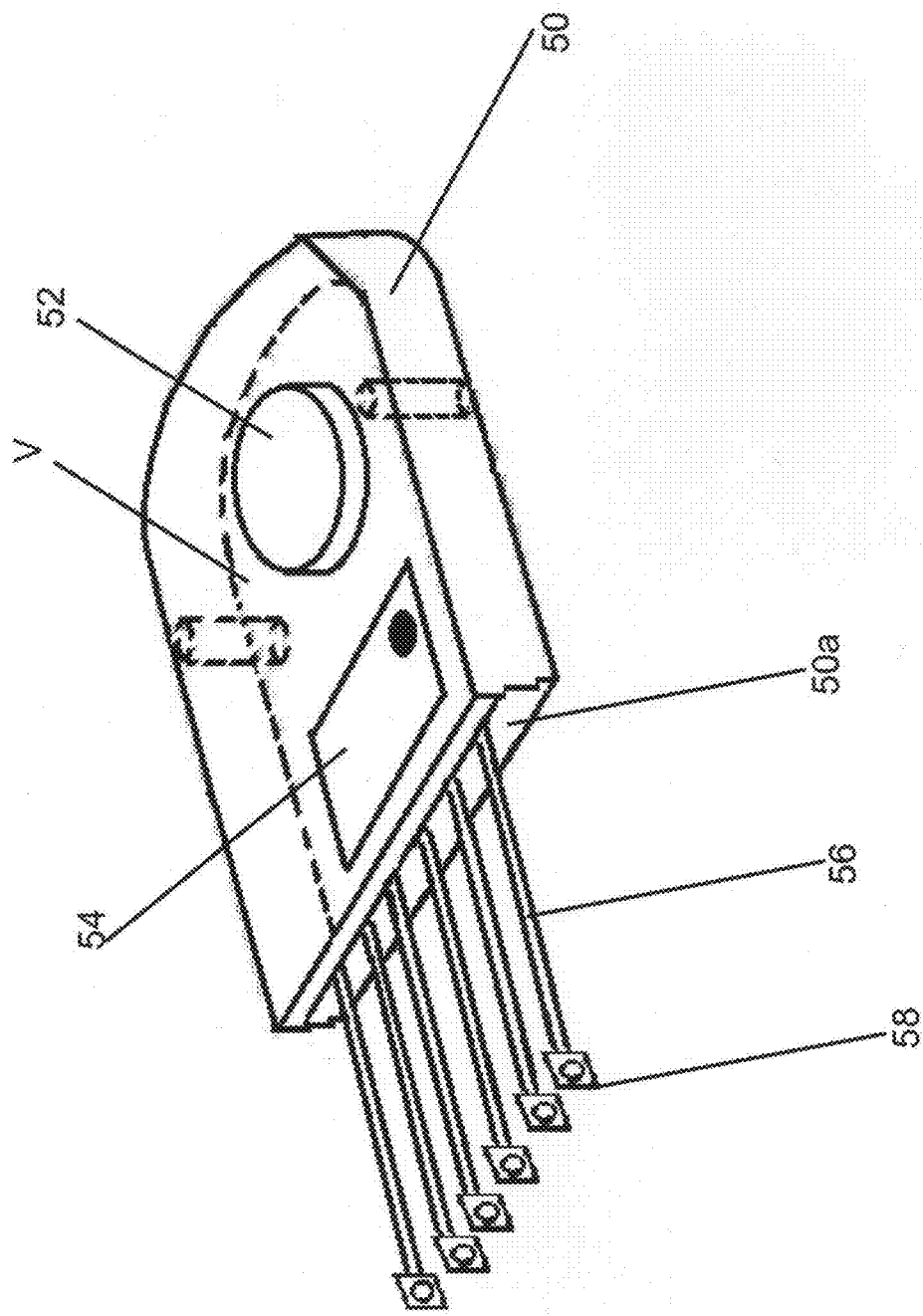
FIG. 5 illustrates an embodiment of a footwear having the battery box with the cover and base welded.

Additionally, the pegs 21a and 21b are connected to the receiving structures 31a and 31b. Turning now to FIG. 5, there is shown the box 50 including a battery 52 within an enclosure V formed by the cover and the base 20 and 30 shown collectively as battery box 50. A circuit 54 is also provided (including: battery 52, wire, circuit board, switch and other electronic elements) for use in illuminating footwear will be fixed on the base 30 of the box 50, put the cover 20 on the base 30 and then seal the box 50 with secondary process such us ultrasonic welding, hot-press or gluing etc. to make sure it waterproof. A number of leads 56 are shown to connect to a number of illumination devices 58. Battery box 50 is preferably used for illuminating footwear and placed in the outsole of the footwear. The structure of the battery box 50 includes a cover and a base and may utilizing secondary processing technology (such us supersonic welding, hot-pressing or gluing), the battery box 50 can be sealed seamlessly. Preferably, the cover 20 and the base 30 are connected to one another by an ultrasonic welding operation. ultrasonic welding is an industrial technique whereby high-frequency ultrasonic acoustic vibrations are locally applied to work pieces 20 and 30 being held together under pressure to create a solid-state weld. It is commonly used for plastics, and especially for joining dissimilar materials. In ultrasonic welding, there are no connective bolts, nails, soldering materials, or adhesives necessary to bind the materials together. The exit 50a of the battery box will sealed by the special material so that it has the waterproof functionality. Battery 52 may be a button cell, like nickel cadmium battery or a lithium ion battery. Battery 52 may be either of two types of batteries: primary batteries (disposable batteries), which are designed to be used once and discarded, and secondary batteries (rechargeable batteries), which are designed to be recharged and used multiple times. Batteries come in many sizes, from miniature cells used to power hearing aids and wristwatches to relatively larger size.

Figure 6:
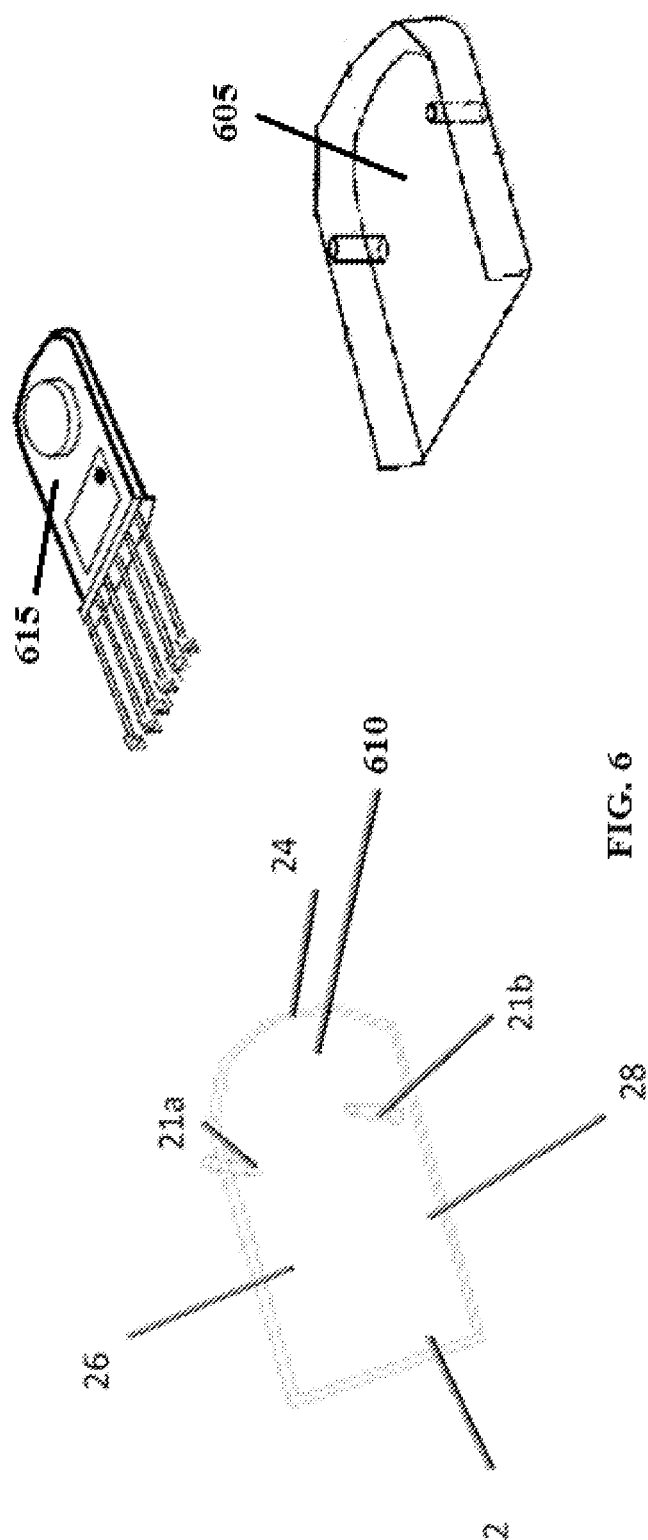
FIG. 6 illustrates another view of the battery box including a first portion and a second portion with a module being separated therefrom.
Figure 7:
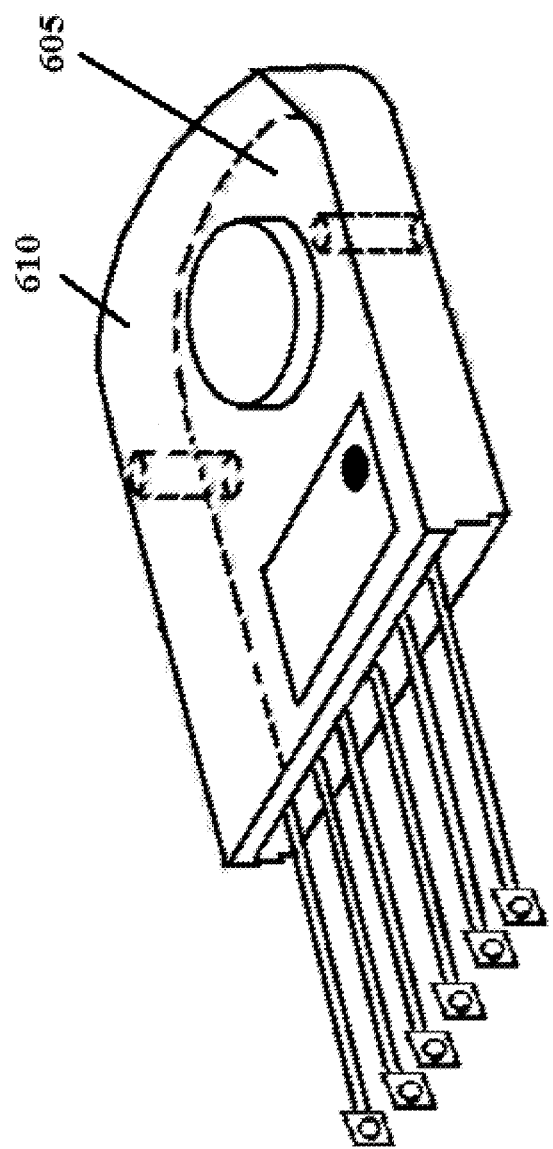
FIG. 7 illustrates another view of the battery box having the battery box therein.

FIG. 6 illustrates another view of the battery box 600 comprising a first member 605 and a second member 610 and a module 615. The first and the second members 605 and 610 are made from a hard plastic and will not crack. An electric module 615 fits inside of the first and the second member 605 and 610 as shown in FIG. 7. FIG. 7 illustrates that the first and the second members 605 and 610 are sealed and wires of the module 615 extend from the first and the second members 605 and 610. The gap between the first and the second module 605 and 610 are sealed by a glue to make an integrated waterproof member.

Figure 8:
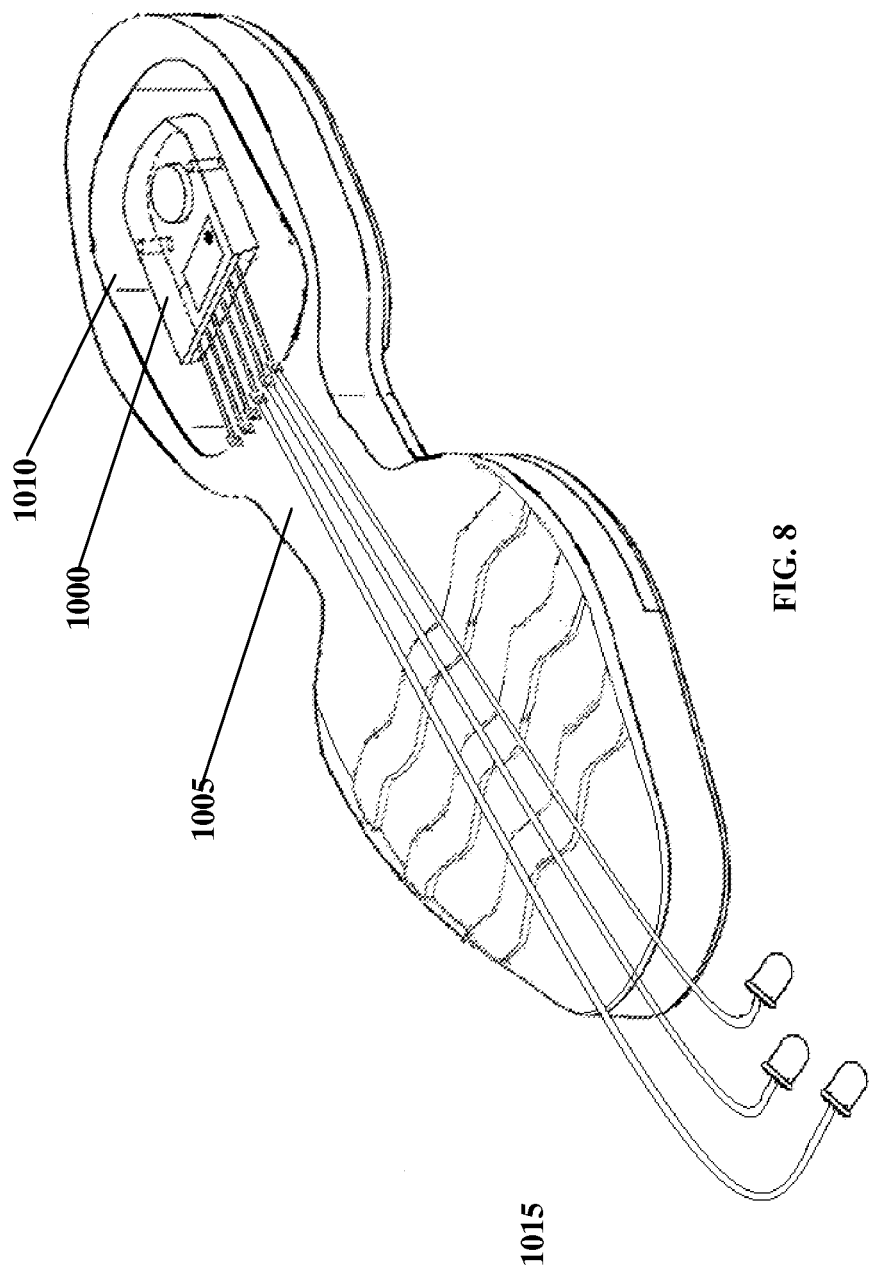
FIG. 8 illustrate the battery box in an outsole and free of resin.

FIG. 8 shows a battery box 1000 located in a cavity 1010 cut into an outsole 1005 of the footwear. The shape of the cavity 1010 conforms to the shape of the battery box 1000 and the battery box 1000 snugly fits into the cavity 1010 without any gap. There is no resin or filler between bottom and sides of the cavity 1010 and the battery box 1000. Additionally, wires 1015 connect the electronic components 1020 and the battery 52 (shown in FIG. 5) inside the battery box 1000 to a plurality of illumination devices placed along an entire outside surface of the footwear.

ABS box has good hardness. When users stand, run, walk or step on box 1000, normal pressure will not cause distortion and will not damage or otherwise harm the electronic components. ABS plastic that forms the box 1000 will not crack, nor open as opposed to current materials, which are filled with resin in order to prevent water leakage and prevent cracking. The instant box 1000 does not need to be filled with resin. The box 1000 may be manufactured through melting both top and bottom, and after sealing the opening to completely seal the box 1000 and to prevent pressure cracks. By omitting the resin, box 1000 also is environmental friendly, and saves manufacturing time, increase productivity, and is easy to maintain. Electronics cannot be repaired if filled with resin. Therefore the instant box 1000 provides a methodology that components contained in the box 1000 are repairable.

While this invention has been particularly shown and described with references to a preferred embodiment thereof, it will be understood by those skilled in the art that is made therein without departing from the spirit and scope of the invention as defined by the following claims.

What is claimed is:

1. A method for manufacturing a footwear with a battery box comprising:
providing a first member;
providing a second member;
placing an illumination control circuit within an enclosure defined by connecting the first member and the second member, wherein the connected first member and the second member further define an exit;
connecting a first end of a plurality of wires to the illumination control circuit through the exit, wherein the plurality of wires extend out from the enclosure through the exit;
connecting a second end of the plurality of wires to a plurality of illumination devices;
creating a resin free water proof battery box by sealing the enclosure and the exit without using resin;
creating a cavity in an outsole of said footwear, wherein shape of the cavity conforms to the shape of the battery box; and
placing the battery box within said cavity, wherein the battery box fits into the cavity without any gap between the battery box and the outsole.

2. The method of claim 1, further comprising installing a battery in the enclosure to energize the illumination control circuit.

3. The method of claim 1, wherein the first member defines a cover of the battery box.

4. The method of claim 1, further comprising arranging wherein the second member defines a base of the battery box.

5. The method of claim 1, wherein the first member and the second member are flexible and may each be bent without cracking.

6. The method of claim 1, wherein the first member and the second member are sealed by a connector.

7. The method of claim 1, wherein the first member and the second member are sealed by a hot press operation including ultrasonic welding.

8. The method of claim 1, wherein the illumination control circuit comprises a battery, wires, circuit board, and switch for illuminating the footwear.

9. The method of claim 8, further comprising connecting placing the illumination control circuit in at least one of the first member and the second member.

10. The method of claim 1, wherein said first member and said second member of said battery box are both made of Acrylonitrile Butadiene Styrene (ABS).

11. A footwear with a battery box comprising:
an outsole of said footwear with a cavity, wherein shape of said cavity conforms to the shape of the battery box;
said battery box comprising:
a first member and a second member;
an illumination control circuit placed within an enclosure defined by connecting the first member and the second member, and wherein the connected first member and the second member further define an exit;
a plurality of wires connected at a first end to the illumination control circuit through the exit, wherein the plurality of wires extend out from the enclosure through the exit, and wherein the plurality of wires are connected at a second end to a plurality of illumination devices; and
said enclosure and the exit sealed without using resin to create a resin free water proof battery box;
said battery box placed within said cavity, wherein said battery box fits into the cavity without any gap between the battery box and the cavity.

12. The footwear with the battery box of claim 11, further comprising a battery in the enclosure to energize the illumination control circuit.

13. The footwear with the battery box of claim 11, wherein the first member defines a cover of the battery box.

14. The footwear with the battery box of claim 11, wherein the second member defines a base member of the battery box.

15. The footwear with the battery box of claim 11, wherein the first member and the second member are resilient.

16. The footwear with the battery box of claim 11, wherein the first member and the second member are sealed by supersonic welding, or by a hot press operation including ultrasonic welding.

17. The footwear with battery box of claim 11, wherein the illumination control circuit comprises wires, circuit board, and a switch for illuminating the footwear.

18. The footwear with the battery box of claim 17, further comprising placing the illumination control circuit in at least one of the first member and the second member.

19. The footwear with the battery box of claim 11, wherein said first member and said second member of said battery box are both made of Acrylonitrile Butadiene Styrene (ABS).

20. A fully illuminated footwear comprising:
a footwear comprising:
an upper;
an insole;
a midsole; and
an outsole;
a battery box comprising:
a cover and a base; and
a battery and an illumination control circuit housed within an enclosure defined by connecting said cover and said base of said battery box, wherein said battery supplies power to said illumination control circuit, wherein said illumination control circuit is used for illuminating said footwear, wherein said illumination control circuit comprises a circuit board, a switch, and wires, wherein said wires are operatively connected through an exit in the battery box to a plurality of illumination devices placed along an entire outside surface of said footwear, and wherein activation of said switch illuminates said footwear to create said fully illuminated footwear;
said enclosure and the exit sealed without using resin to create a resin free water proof battery box;
said outsole further comprising:
a cavity in said outsole, wherein shape of said cavity conforms to the shape of the battery box, wherein said battery box is placed inside said cavity, and wherein said battery box fits into said cavity without any gap between the battery box and the outsole.

21. The fully illuminated footwear of claim 20, wherein said cover and said base of said battery box are both made of Acrylonitrile Butadiene Styrene (ABS).

22. A modified outsole with a battery box for a footwear comprising:
an outsole with a cavity located in said outsole, wherein shape of said cavity conforms to the shape of the battery box, wherein said battery box is placed inside said cavity, and wherein said battery box fits into said cavity without any gap between the battery box and the outsole; and
said battery box comprising:
a cover and a base; and
a battery and an illumination control circuit housed within an enclosure defined by connecting said cover and said base of said battery box, wherein said battery supplies power to said illumination control circuit, wherein said illumination control circuit is used for illuminating said footwear, wherein said illumination control circuit comprises a circuit board, a switch, and wires, wherein said wires are operatively connected through an exit to a plurality of illumination devices 1p aced along an entire outside surface of said footwear, and wherein activation of said switch illuminates said plurality illumination devices;
said enclosure and the exit sealed without using resin to create a resin free water proof battery box.

23. The modified outsole of claim 22, wherein said cover and said base of the battery box are both made of Acrylonitrile Butadiene Styrene (ABS).

* * * * *